Jan. 6, 1925.
W. E. GOSSLING
1,522,439
STORAGE BATTERY COVER AND POST SEAL
Filed Dec. 10, 1920
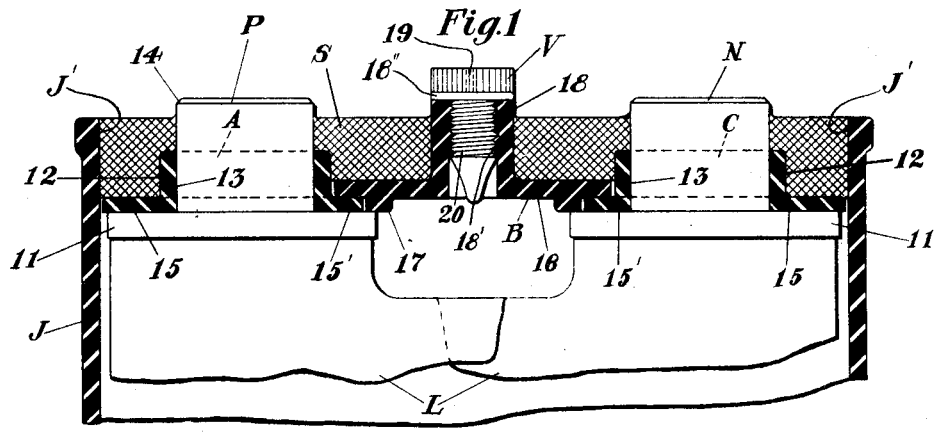
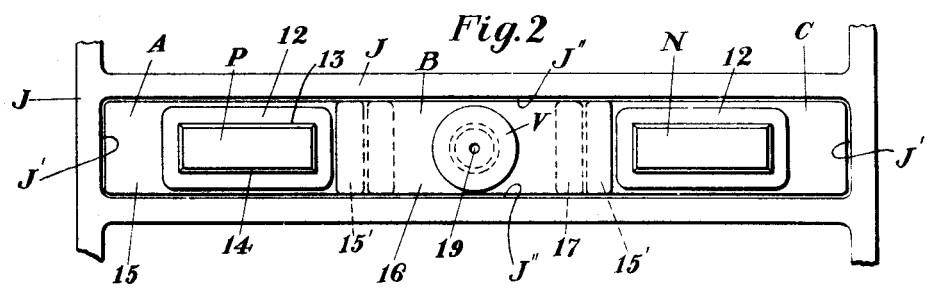
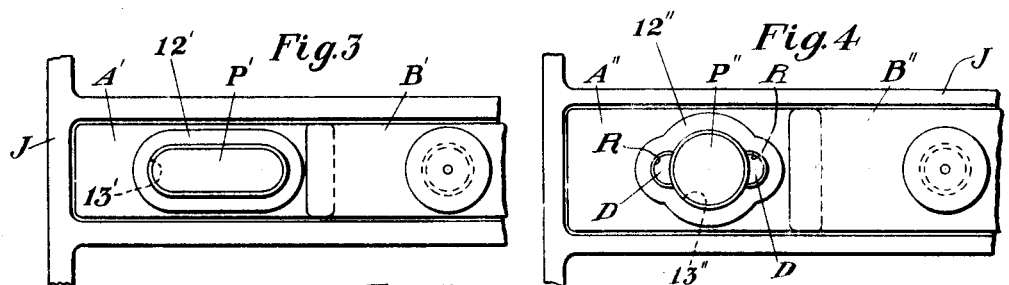
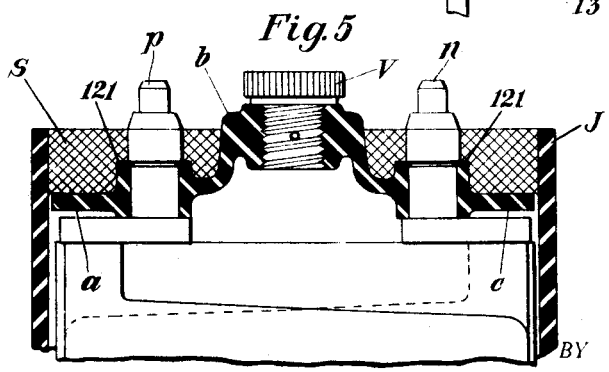
INVENTOR.
Walter E. Gossling
BY
ATTORNEY.

Patented Jan. 6, 1925.

1,522,439

UNITED STATES PATENT OFFICE.

WALTER E. GOSSLING, OF NEW YORK, N. Y., ASSIGNOR TO THE PREST-O-LITE COMPANY, INC., A CORPORATION OF NEW YORK.

STORAGE-BATTERY COVER AND POST SEAL.

Application filed December 10, 1920. Serial No. 429,749.

*To all whom it may concern:*

Be it known that I, WALTER E. GOSSLING, a citizen of the United States, residing at 156 Sherman Ave., New York, in the county of New York and State of New York, have invented certain new and useful Improvements in Storage-Battery Covers and Post Seals, of which the following is a specification.

This invention relates to storage batteries and particularly to an improved cover for a storage battery cell and means for sealing the cell to prevent leakage of the electrolyte therefrom. The invention is. herein illustrated as applied to storage batteries of the airplane type, but it is to be understood that in its broader aspects the invention may also be applied to other types of storage batteries.

In some types of storage batteries, especially those where the cell dimensions are comparatively small, as for example in airplane batteries, it has heretofore been difficult to provide leak proof joints between the sealing compound and the antimony lead terminal posts of the cell, as well as between other portions of the cell, and it is a primary object of the present invention to provide a cover means that may readily be applied to such cells and by means of which the joints may be effectively sealed to prevent leakage of the electrolyte.

The above and other objects and the novel features of the invention will be apparent from the following description taken in connection with the drawings, which constitute a part of this application, and in which Fig. 1 is a vertical longitudinal sectional view illustrating a portion of a storage battery cell embodying this invention.

Fig. 2 is a plan view of the same, the sealing composition being omitted for the sake of clearness, Figs. 3 and 4 are partial plan views of other storage battery cells embodying this invention, and Fig. 5 is a sectional view of a portion of another battery and cover embodying this invention.

Generally speaking, the improved cover embodying the present invention, is adapted to fit within the upper end of the cell and comprises bushing portions having a press or fit with the terminal posts, an intermediate portion having a vent projecting above said bushing portions, and sealing composition covering the joints between the posts and cover, and the cover and cell walls. A desirable embodiment of the invention consists of a number of sections which are complementary and which, when they are assembled together, form the complete cover proper over which the sealing composition is poured. In this arrangement, the cover proper consists of two similar bushing members which are provided with openings to tightly fit the positive and negative terminal posts of the cell, with an intermediate bridging member having a vent and adapted to abut against or overlap the opposed ends of the bushing members, thereby providing a substantially continuous three-piece cover disposed a slight distance below the upper edge of the cell. The cover is preferably formed of suitable non-corrodible comparatively rigid but slightly elastic or expansible material, such as hard rubber, so that the openings in the bushing parts may be slightly expanded when fitting them over the terminal posts to provide a press fit on the terminal posts. The terminal posts may be painted with a thin sealing compound or acid resisting paint to insure a tight joint between the posts and the bushings. The bridging part is provided with a hollow boss on its upper side desirably projecting above said bushings and being internally threaded to receive a vent plug having a capillary vent passage therethrough.

For purposes of illustration, the invention is shown as applied to a storage battery of the airplane type, having a container or jar consisting of a number of integrally connected cells J. Each cell may be substantially rectangular in outline and relatively narrow as compared with its length dimension, and of suitable insulating material, such as hard rubber. The cell J contains the usual acid or other electrolyte in which groups of positive and negative plates L of any desirable type, are submerged. These groups of plates are respectively secured to the similar positive and negative strap or terminal posts P and N respectively, as by casting or otherwise uniting the upper or lug portions of the plates of similar polarity together to the plate straps 11, which may be cast integrally with the lower ends of these terminal posts, the lugs on the plates and the plate straps being substantially the same width. The terminal posts P and N are of antimony-lead or other suitable conducting, non-corrodible alloy and of suitable cross section, in the present instance being comparatively narrow and long or somewhat similar in general outline to the outline of the cell.

In order that the electrolyte within the cell shall not leak out, a suitable cover means is applied thereto desirably below the upper edge of the cell and below the upper ends of the terminal posts. The limited cell dimensions renders it difficult to effectively seal the cell against leakage, with covers heretofore employed, and a cover consisting of parts having a press fit with the terminal posts has been found to be more satisfactory. The cover means as illustrated in Figs. 1 to 4 comprises two substantially similar bushing members A and C, respectively, fitting the posts P and N, and an intermediate bridging member B adapted to overlap the opposed portions of the bushing members A and C and completing the cover proper. When the cover members or sections A, B and C are adjusted in place, sealing composition is poured onto their upper surfaces to the level of the upper edge of the cell jar to seal all joints.

Inasmuch as the bushing members A and C are substantially similar in construction, only one of them will be described in detail. Each bushing member may be formed of suitable non-corrodible comparatively rigid but slightly elastic material such as hard rubber, and comprises a sleeve portion 12, the rectangular opening 13 of which is initially made of slightly smaller dimensions than the cross section of the strap post to which it is to be applied so that when the bushing is applied by being pressed directly onto the post, it will have a press fit therewith and form an acid proof joint with the surface of the post and the acid resisting paint or coating of sealing composition which may be applied to the exterior of the post. The upper end of the post may be beveled as at 14 so that the bushing may be more easily applied to the post and the bushing may be slightly heated so that it will more readily expand when it is applied to the post. By using elastic material for these sleeves, the tension or stresses set up in the material by forcing the sleeves down over the posts causing the hard rubber about the openings to exert a gripping action on the posts and insuring a tight fit of the sleeves on the posts. The lower end of the bushing is provided with a rectangular flange 15, the under surface of which abuts against and is adapted to provide a sealing joint with the upper face of the plate strap 11 when the bushing has been applied to the post. Three of the edges of the bushing 15 extend laterally closely adjacent to the inner end walls J' and inner side walls J" of the cell jar and the fourth edge of the flange extends toward the corresponding flange on the other post, as at 15', providing opposed supports or abutments for the intermediate cover member B.

The intermediate cover member B is also desirably of non-corrodible relatively rigid material such as hard rubber and may be of any suitable construction to close the gap between the opposed parts 15' of the flanges on the bushings and the opposite inner walls J" of the cell jar. The intermediate cover section B may consist of a substantially rectangular plate portion 16 that is adapted to lie on or abut against the ledge formed by the flange portions 15' of the bushings and may be provided on its under sides inwardly from its end edges, with lugs 17 adapted to fit close to or abut against the edges of the flanges and against the upper faces of the plate straps 11. Thus the ends of the cover member B interfit or abut against the flange portions of the bushings A and C and complete the cover proper, substantially closing the upper end of the cell jar J above the plate straps 11, 11. It is not essential that the sealing bushings A and C be forced down onto the upper face of the plate straps 11. Where it is found desirable, a boss may be cast on the plate strap post some distance above the plate strap 11 to form a shoulder against which the under surface of the flange 15 may abut. Furthermore, the opposite ends of the plate portion 16 of the intermediate cover member B may be grooved or otherwise formed so as to receive in such groove the opposed flanges 15' of the bushing members A and C, thereby locking the parts A, B and C together and for some purposes providing a better seal between the intermediate member B and the bushing members A and C. For example, the projecting lugs 17 may be continued downwardly and outwardly to form a groove in the edges of the intermediate member B to receive the opposed edges of the flanges 15' on the bushings A and C. Such parts may be fitted in assembled relation before the cover is inserted in place, thereby locking the parts in position.

In order to provide for the escape of gases formed during the charging of the battery, the cover member B may be provided on its upper side with a hollow boss 18 that projects upwardly slightly above the upper edge of the cell jar and is internally threaded as at 18' to receive a vent plug V of the usual or any preferred type having a suitable capillary vent passage 19 in the threaded stem 20 that fits within the threaded portion 18' of the boss 18, and may be provided with a sealing gasket, as at 18".

When the bushing members A and C and the intermediate member B have been assembled in position, suitable sealing composition S in a molten condition, is poured upon the upper surfaces thereof substantially level with the upper edge of the cell jar J to seal the joints between the cover sections and the inner wall of the cell, the joints between the bushings and the antimony-lead terminal posts, as well as the joints between the bushing members A and C and the intermediate member B, thus providing an acid-proof cover and seal for the cell jar, and one in which the several parts of the cover may be readily placed in assembled relation. Either of the sections A or C may be removed without disturbing the other, and the intermediate section B is separable from the sections A and C and removable without disturbing them.

In the construction shown in Fig. 3, the general shape of the plate strap post P″ is elliptical, the ends of the post being rounded to avoid corners. The opening 13′ in the sleeve portion 12′ of the bushing member A′ in this instance, is of a shape similar to the shape of the post P″, except that its dimension is initially slightly smaller than that of the post so that when the bushing member A′ is forced onto the post P″, a press fit will be obtained. The type of cover shown in Fig. 3 is otherwise substantially the same as that illustrated in Figs. 1 and 2.

In Fig. 4, the plate strap or terminal post P‴ is substantially cylindrical and of course the opening 13″ in the sleeve portion 12″ of the bushing member A″, is substantially circular but initially slightly smaller than the size of the post P‴ to obtain the press fit between the bushing and post previously referred to. The lower portion of the strap post P‴, however, may have one or more outward projections D thereon, adapted to fit into one or more corresponding recesses or indentations R in the wall of the opening 13″ so as to assist in locating the bushing member A″ accurately in relation to the post P″. The type of cover and post sealing means shown in Fig. 4 is otherwise substantially similar to the one disclosed in Figs. 1 and 2.

In the cover shown in Fig. 5, the parts a, b and c are integrally joined together, the bushing parts a and c being provided with sleeve portions 121 having openings initially of smaller size than the terminal post p, n and adapted to have a press fit therewith and bearing on shoulders on the posts, and the intermediate portion b having a vent V projecting above said bushing portions and above the top edge of the cell. Sealing composition S covers the joints between the bushings and the posts and between the cover and the inside of the cell J. In other respects, this cover is substantially similar to the one shown in Figs. 1 and 2.

While the invention has been shown and described as applied to an airplane-type battery cell, it is to be understood that its application is not necessarily limited to such batteries. Moreover, various modifications of the invention may be devised without departing from the principles herein disclosed or sacrificing any of the advantages thereof.

I claim:

1. The combination with a storage battery cell, of terminal posts connected to the plates in said cell and projecting from the upper end thereof, and cover means for said cell comprising flanged bushings of hard rubber having a press fit with said posts, and a plate bridging the space between the opposed flanges of said bushings and interfitting with such flanges, said plate having an upper hollow boss intermediate its ends, a vent plug fitting said hollow boss, and sealing composition covering the joints between said bushings and plate, the joints between said bushings and posts and the joints between said cell wall and the bushings and plate.

2. The combination with a storage battery cell that is relatively narrow, elements in said cell, relatively narrow terminal posts connected to said elements and projecting above the upper end of said cell, and cover means for said cell comprising bushings provided with narrow openings, the inner walls of which are press fitted to said posts, said bushings having flanges extending laterally adjacent to inside walls of said cell and a plate disposed between and interfitting with said flanges, said plate having a vent passage therein.

3. In a storage battery, the combination of a cell jar relatively long and narrow in plan, elements in said jar, straps connected to said elements, terminal posts integral with said straps and having parts relatively long and narrow in transverse section projecting from the upper end of said jar, and cover means for said jar including hard rubber bushings comprising sleeves having a press fit with said posts and flanges disposed at the lower ends of said sleeves bearing on said straps and extending adjacent to inside walls of said jar, a plate disposed between said bushings and having portions abutting against and overlapping portions of the flanges of said bushings, and sealing composition covering the joints between the parts of said cover means and the jar and posts adjacent thereto.

4. The combination with a storage battery having terminal posts, of cover means provided with hard rubber bushing portions having openings therethrough initially of smaller cross-sectional size than such posts, said posts being forced into said openings and slightly expanding the latter, thereby setting up stresses in said bushing portions adapted to exert a gripping action constituting the sole means that secures such cover means to said posts.

5. The method of securing and sealing a cover to a terminal post of a storage battery that comprises providing cover means with hard rubber portions having openings initially of smaller cross-sectional size than such posts, forcing such posts into such openings, thereby slightly expanding the latter and setting up stresses in the adjacent cover portions adapted to exert a gripping action on such posts to secure the cover means thereto.

6. The method of securing and sealing a cover to the terminal posts of a storage battery that comprises providing hard rubber cover means with bushing portions having openings initially of smaller cross-sectional size than the parts of such posts to which such cover is finally fitted, heating such cover means, and forcing such posts into such openings while such cover means is in heated condition, whereby such openings are slightly expanded and upon cooling stresses are set up in the adjoining bushing portions which exert a gripping action on such posts to secure said cover means thereto and seal the joint between the cover means and posts.

In testimony whereof, I affix my signature.

WALTER E. GOSSLING.